(12) United States Patent
Monfort Faure et al.

(10) Patent No.: US 12,539,296 B2
(45) Date of Patent: Feb. 3, 2026

(54) MONTELUKAST FOR THE TREATMENT OF EROSIVE HAND OSTEOARTHRITIS

(71) Applicant: MMC INTELLECTUAL PROPERTY INSTITUTE, S.L., Madrid (ES)

(72) Inventors: Jordi Monfort Faure, Madrid (ES); Josep Verges Milano, Madrid (ES); Fernando García Alonso, Madrid (ES); Jordi Ramentol Massana, Madrid (ES); José Ángel Sánchez García, Madrid (ES); Nuria Sanz Menéndez, Madrid (ES); Marta Vicario De La Torre, Madrid (ES)

(73) Assignee: FARMALÍDER, S.A., Madrid (ES)

( * ) Notice: Subject to any disclaimer, the term of this patent is extended or adjusted under 35 U.S.C. 154(b) by 690 days.

(21) Appl. No.: 17/296,703

(22) PCT Filed: Nov. 25, 2019

(86) PCT No.: PCT/EP2019/082425
§ 371 (c)(1),
(2) Date: May 25, 2021

(87) PCT Pub. No.: WO2020/109230
PCT Pub. Date: Jun. 4, 2020

(65) Prior Publication Data
US 2022/0047570 A1 Feb. 17, 2022

(30) Foreign Application Priority Data
Nov. 26, 2018 (EP) .................................. 18382851

(51) Int. Cl.
*A61K 31/47* (2006.01)
*A61K 9/00* (2006.01)
*A61P 19/02* (2006.01)

(52) U.S. Cl.
CPC ............ *A61K 31/47* (2013.01); *A61K 9/0014* (2013.01); *A61K 9/0053* (2013.01); *A61P 19/02* (2018.01)

(58) Field of Classification Search
None
See application file for complete search history.

(56) References Cited

FOREIGN PATENT DOCUMENTS

| WO | WO-2012069842 A1 * | 5/2012 | ........... A61K 31/196 |
|----|---|---|---|
| WO | 2015/084883 A2 | 6/2015 | |

OTHER PUBLICATIONS

Ramonda et al. Serological markers of erosive hand osteoarthritis. European Jn of Internal Medicine, vol. 14, Issue 1. Published Jan. 2013. (Year: 2013).*

Icrpaedia. Absorbed, Equivalent, and Effective Dose. Retrieved from the Internet on Jan. 8, 2024, http://icrpaedia.org/Absorbed,_Equivalent,_and_Effective_Dose. (Year: 2024).*
Bean et al. Erosive Hand Osteoarthritis: Recent Advances and Future treatments, Curr Rheumatol Rep. vol. 26, published 2024. (Year: 2024).*
Ramonda, R., et al., Joint and bone assessment in hand osteoarthritis, Clin. Rheumatol., 2014, 33 (1), 11-19.
Zhang, W., et al., EULAR evidence-based recommendations for the diagnosis of hand osteoarthritis: report of a task force of ESCISIT, Ann. Rheum. Dis., 2009, 68: 8-17.
Gabay, C., et al., Symptomatic effects of Chondroitin 4 and Chondroitin 6 Sulfate on hand osteoarthritis, Arthritis Rheum., 2011, 63 (11), 3383-3391.
Kloppenburg M, et al., 2018 update of the EULAR recommendations for the management of hand osteoarthritis, Ann Rheum Dis 2019, 78, 16-24.
R Altman, Pharmacological Therapies for Osteoarthritis of the Hand, Drugs Aging, 2010, 27 (9), 729-745.
Arden, N., et al., Atlas of Osteoarthritis, 2014, Springer Healthcare, ISBN 978-1-910315-15-6.
Altman, R., et al., The American College of Rheumatology Criteria for the Classification and Reporting of Osteoarthritis of the Hand, Arthritis Rheum., 1990, 33, 1601-1610.
Labelle, M., et al., Discovery of MK-0476, A Potent and Orally Active Leukotriene D4 Receptor Antagonist Devoid of Peroxisomal Enzyme Induction, Bioorg. Med. Chem. Lett, 1995, 5(3), 283-288.
Fanning, P.J., et al., Montelukast Sodium as a Treatment for Experimental Osteoarthritis in Mice, Osteoarthritis and Cartilage 2009, vol. 17, S282-S283.
Song, W., et al., Antagonism of cysteinyl leukotriene receptor 1 (cysLTR1) by montelukast suppresses cell senescence of chondrocytes, Cytokine 103 (2018) 83-89.
Stern, A.G., et al., Association of erosive hand osteoarthritis with a single nucleotide polymorphism on the gene encoding interleukin-1 beta, Osteoarthritis Cartilage, 2003, 11(6), 394-402.
Ramonda, R., et al., Immunogenetic aspects of erosive osteoarthritis of the hand in patients from northern Italy, Scand. J. Rheumatol, 2011, 40, 139-144.
Haugen, I.K., et al., Prevalence, incidence and progression of hand osteoarthritis in the general population: the Framingham Osteoarthritis Study, Ann. Rheum. Dis., 2011, 70 (9), 1581-1586.
Storms, W., et al., Clinical safety and tolerability of montelukast, a leukotriene receptor antagonist, in controlled clinical trials in patients aged ≥ 6 years, Clin. Exp. Allergy, 2001, 31, 77-87.
Lane, N.E., et al., OARSI-FDA Initiative: defining the disease state of osteoarthritis, Osteoarthritis Cartilage, 2011, 19, 478-482.
Aitken, D., et al., A randomized double-blind placebo-controlled crossover trial of HUMira (adalimumab) for erosive hand Osteoarthritis—The HUMOR trial, Osteoarthritis Cartilage, 2018, 26, 880-887.

(Continued)

*Primary Examiner* — James H Alstrum-Acevedo
*Assistant Examiner* — Lauren Wells
(74) *Attorney, Agent, or Firm* — Casimir Jones, S.C.; Tristan A. Fuierer

(57) ABSTRACT

The present invention relates to montelukast for use in the treatment of erosive hand osteoarthritis. According to this use, montelukast can be administered either orally or topically, in the form of any suitable pharmaceutical composition. Patients suffering from erosive hand osteoarthritis treated with montelukast showed improvement in clinical symptoms and in radiological parameters, and also reported pain relief and hand functionality improvement.

16 Claims, No Drawings

(56) References Cited

OTHER PUBLICATIONS

Wang, J., Efficacy and safety of adalimumab by intraarticular injection for moderate to severe knee osteoarthritis: An open-label randomized controlled trial, J. Int. Med. Res., 2018, 46, 326-334.

Kloppenburg, M., et al., Hand osteoarthritis—a heterogeneous disorder, Nat. Rev. Rheumatol., 2012, 8, 22-31.

Greenspan, A., Erosive Osteoarthritis, Semin. Musculoskelet. Radiol., 2003, 7, 155-159.

Mansour et al.. "Montelukast attenuates rotenone-induced microglial activation/p38 MAPK expression in rats: Possible role of its anti-oxidant, anti-inflammatory and antiapoptotic effects", Toxicol Appl Pharmacol. Nov. 1, 2018; 358:76-85.

Vikram V. Nimbalker et al., "Montelukast and Cetrizine May Ameliorate Progression of Rheumatoid Arthritis", International Journal of Clinical and Biomedical Research 2016; 2(3): 34-38.

Zhou et al., "Montelukast attenuates neuropathic pain through inhibiting p38 mitogen-activated protein kinase and nuclear factor-kappa B in rat model of chronic constriction injury". Anesth Analg., 2014, 118(5): 1090-1096.

Van Spil et al., Osteoarthritis phenotypes and novel therapeutic targets, Biochemical Pharmacology, Mar. 1, 2019, vol. 165, pp. 41-48.

Keen et al., Response of symptoms and synovitis to intra-muscular methylprednisolone in osteoarthritis of the hand: an ultrasonographic study, Rheumatology, Mar. 10, 2010, vol. 49, pp. 1093-1100, doi:10.1093/rheumatology/keq010.

S.E. Banks, Erosive osteoarthritis: a current review of a clinical challenge, Clin Rheumatol. 29(7):697-706 (2010).

* cited by examiner

MONTELUKAST FOR THE TREATMENT OF EROSIVE HAND OSTEOARTHRITIS

CROSS-REFERENCE TO RELATED APPLICATIONS

This application is filed under the provisions of 35 U.S.C. § 371 and claims the priority of International Patent Application No. PCT/EP2019/082425 filed on 25 Nov. 2019 entitled "MONTELUKAST FOR THE TREATMENT OF EROSIVE HAND OSTEOARTHRITIS" in the name of Jordi MONFORT FAURE, et al., which claims priority to European Patent Application No. 18382851.6, filed on 26 Nov. 2018, both of which are hereby incorporated by reference herein in their entirety.

TECHNICAL FIELD

The present invention relates to the pharmacological management of erosive hand osteoarthritis.

TECHNICAL BACKGROUND

Osteoarthritis is a degenerative joint disease that affects the whole joint, including the hyaline cartilage, subchondral bone, the synovial membrane, the ligaments and the joint capsule, and is characterized by the degradation of the articular cartilage, subchondral bone changes and osteophyte formation at the joint margins, and is commonly associated with pain. Joints commonly associated with osteoarthritis include the knee, hip and hand.

Compared to knee and hip, erosive hand osteoarthritis seems to be a separate, substantially different, subset of the disease as far as genetic factors, pathogenesis and disease course are concerned, as disclosed by Ramoneda et al., *Joint and bone assessment in hand osteoarthritis*, Clin. Rheumatol., 2014, 33 (1), 11-19.

Also the article Stern et al., *Association of erosive hand osteoarthritis with a single nucleotide polymorphism on the gene encoding interleukin-1 beta*, Osteoarthritis Cartilage, 2003, 11 (6), 394-402 confirms that there are genetic factors which are specific for hand osteoarthritis and, in particular, for erosive hand osteoarthritis, namely, it discloses the association between erosive hand osteoarthritis and a genomic region containing the interleukin-1b (IL-1b) 5810 single nucleotide polymorphism. Similarly, the article Ramoneda et al., *Immunogenic aspects of erosive osteoarthritis of the hand in patients from northern Italy*, Scand. J. Rheumatol, 2011, 40, 139-144 also reports some genetic predisposition to erosive hand osteoarthritis.

A specific feature of hand osteoarthritis is that it simultaneously affects multiple hand joints, which makes it a heterogeneous and complex disorder. However, hand osteoarthritis has traditionally received less attention than osteoarthritis of the weight-bearing joints, such as knees and hips.

Clinical hallmarks of hand osteoarthritis include bony enlargement and deformities of the hand joints, at times accompanied by soft tissue swelling (Zhang et al., *EULAR evidence-based recommendations for the diagnosis of hand osteoarthritis: report of a task force of ESCISIT*, Ann. Rheum. Dis., 2009, 68: 8-17). Symptoms of hand osteoarthritis include pain, stiffness, deformity of the joints and functional impairment, including decrease in grip strength, hand mobility and dexterity, leading to reduced quality of life of the affected patients.

Erosive hand osteoarthritis is a particularly severe form of the osteoarthritis of the hand whose predominant features are central erosions and collapse of the subchondral bone plate. Erosive hand osteoarthritis can affect the first carpometacarpal (CMC) joint as well as the interphalangeal joints. Erosive hand osteoarthritis is characterized by an abrupt onset, more pronounced pain and functional impairment, a faster progression, inflammation and worse outcomes than non-erosive hand osteoarthritis.

Hand osteoarthritis is highly prevalent, with a prevalence of 20-30% of adults, with age-related increases, reaching a prevalence of 50% after the age of 60 years, as reported in Gabay et al., *Symptomatic Effects of Chondroitin 4 and Chondroitin 6 sulfate on hand osteoarthritis*, Arthritis Rheum., 2011, 63 (11), 3383-3391. Among the risk factors for hand osteoarthritis, age is perhaps the most important, with an increase in prevalence with aging. Furthermore, hand osteoarthritis is also sex-related, and is much more prevalent in women than in men, suggesting a hormonal influence on prevalence. Other common risk factors are obesity, occupational factors and genetic factors.

Regarding erosive hand osteoarthritis, there is a higher prevalence in women (9.9%) than in men (3.3%) as reported in Haugen et al. *Prevalence, incidence and progression of hand osteoarthritis in the general population: the Framingham Osteoarthritis Study*, Ann. Rheum. Dis. 2011, 70 (9), 1581-1586. In the population with hand pain or with symptomatic hand osteoarthritis, the prevalence of erosive hand osteoarthritis is around 7% and 10%, respectively. However, in a population with symptomatic hand osteoarthritis from secondary care, the prevalence raises to 25%.

Pharmacological treatment of hand osteoarthritis, and in particular of erosive hand osteoarthritis, entails specific challenges, which are different from those of hip or knee osteoarthritis. Thus, not only pain management is a primary objective, but improving hand functionality is also essential due to its huge impact on the quality of life of affected patients.

Accordingly, in the 2018 update of the EULAR recommendations for the management of hand osteoarthritis (Kloppenburg et al., Ann. Rheum. Dis, 2018), it is stated that the primary goal of managing hand osteoarthritis is to control symptoms, such as pain and stiffness, and to optimize hand function, in order to maximize activity, participation, and quality of life. Patients with hand osteoarthritis should not be treated with conventional or biological disease-modifying antirheumatic drugs, since their efficacy could not be demonstrated.

Different therapeutic options have been disclosed in the art for the management of hand osteoarthritis, as disclosed, for example, in Altman R. D., *Pharmacological therapies for osteoarthritis of the hand*, Drugs Aging, 2010, 27 (9), 729-745. The current therapeutic options only include analgesics, such as paracetamol, oral nonsteroidal anti-inflammatory drugs (NSAIDs), such as naproxen, dexketoprofen, ibuprofen, or diclofenac, oral opioids, such as tramadol and oral corticosteroids. However, these drugs may involve severe adverse effects, which typically increase with the age and, therefore, they may not be recommended for patients with hand osteoarthritis.

Topical treatments, for example, with the NSAID diclofenac sodium or with capsaicin are preferred in terms of safety, although the efficacy may not be entirely satisfactory.

Other drugs reported for pain relief and improvement in function in patients with hand osteoarthritis are chondroitin sulfate and glucosamine, although there is limited evidence available to support their efficacy.

Other treatment options include intra-articular corticosteroids or hyaluronic acid, but they show only modest symptomatic efficacy and it is not comparable with the efficacy results when these interventions are performed for knee and hip osteoarthritis therapy.

In summary, the current pharmacological therapy only focuses on the relief of the symptoms and the options available so far have shown little efficacy for pain control and frequently involve undesired side effects, particularly derived from the use of oral NSAIDs.

On the other hand, surgery is not a good option either, since surgical interventions for hand osteoarthritis are much less effective than surgical interventions for knee or hip osteoarthritis.

Therefore, at present, there is no effective pharmacological therapy for hand osteoarthritis and, particularly, for erosive hand osteoarthritis, neither to stop the progression of the disease nor for the effective relief of its symptoms.

In the article Fanning et al., *Montelukast sodium as a treatment for experimental osteoarthritis in mice*, Osteoarthr. Cartil., 2009, 17 (Suppl. 1), S282, it is disclosed the use of montelukast in an experimental model of knee osteoarthritis in mice, where the right knees of mice were surgically induced to osteoarthritis using the destabilization of the medial meniscus (DMM). Due to the similarities of DMM model to humans at risk for osteoarthritis from meniscal damage, it is suggested that the treatment with montelukast could delay the progression of incipient osteoarthritis in patients proximal to the time of meniscal repair. However, nothing is disclosed or suggested about the use of montelukast for treating the complexity of erosive osteoarthritis of the human hand, as expected, due to the specific genetic factors involved in the onset of erosive hand osteoarthritis.

In view of the high prevalence of erosive hand osteoarthritis, its high impact on the quality of life of the affected patients and the unsuccessful therapeutic options available, there is a need for new safe and effective pharmacological treatments of this disorder.

DETAILED DESCRIPTION OF THE INVENTION

The object of the present invention is montelukast or a pharmaceutically acceptable salt thereof for use in the treatment of erosive hand osteoarthritis in a human subject.

Another aspect of the invention is a method of treating erosive hand osteoarthritis in a patient comprising the step of administering to a patient in need thereof an effective amount of montelukast or a pharmaceutically acceptable salt thereof.

Another aspect of the invention is the use of montelukast or a pharmaceutically acceptable salt thereof for the preparation of a medicine for the treatment of erosive hand osteoarthritis in a human subject.

The authors of the present invention have surprisingly found that montelukast, which is a leukotriene receptor antagonist used for the treatment of asthma and to relieve the symptoms of seasonal allergies, is effective for the treatment of hand osteoarthritis and, particularly, for the treatment of erosive hand osteoarthritis.

Along the present description, as well as in the claims, the terms "a," "an," or "the" not only include aspects with one member (singular), but also includes aspects with more than one member (plural).

The terms "about" or "approximately" referred to amounts, as used herein, are meant to include a certain deviation of the qualified amount, namely of ±5%.

The numerical ranges disclosed herein are meant to include any number falling within the ranges and also the lower and upper limits.

Erosive Hand Osteoarthritis

The present invention relates to the treatment of erosive hand osteoarthritis. Within the context of the present invention, "treatment" means the treatment of human subjects.

Patients affected by hand osteoarthritis are diagnosed following standard methods, which are well known to the doctors, either specialists or general practitioners, which typically combine clinical and radiographical observations.

Hand osteoarthritis is primarily manifested as pain and swelling in the distal interphalangeal (DIP) joints (Heberden's nodes), proximal interphalangeal (PIP) joints (Bouchard's nodes) and thumb base joints; there is often bony enlargement with or without deformity, for example as disclosed in Arden et al., *Atlas of Osteoarthritis*, 2014, Springer Healthcare, ISBN 978-1-910315-15-6.

For example, the criteria of ACR (the American College of Rheumatology), as disclosed in Altman et al. *The American College of Rheumatology criteria for the classification of osteoarthritis of the hand*, Arthritis Rheum., 1990, 33, 1601-1610, are widely followed. According to these criteria, hand osteoarthritis is diagnosed when there is hand pain, aching or stiffness, and 3 or 4 of the following: i) hard tissue enlargement of 2 or more of 10 selected joints, ii) hard tissue enlargement of 2 or more distal interphalangeal (DIP) joints, iii) fewer than 3 swollen metacarpophalangeal (MCP) joints and iv) deformity of at least 1 of 10 selected joints; wherein the 10 selected joints are the second and third distal interphalangeal (DIP), the second and third proximal interphalangeal (PIP) and the first carpometacarpal (CMP) joints of both hands.

Alternatively, according to the criteria of EULAR (European League Against Rheumatism), as disclosed in Zhang et al., *EULAR evidence-based recommendations for the diagnosis of hand osteoarthritis: report of a task force of ESCISIT*, Ann. Rheum. Dis., 2009, 7, 17, confident clinical diagnosis of hand osteoarthritis can be made in adults aged over 40 years with (i) pain on usage, (ii) intermittent symptoms; and (iii) only mild morning or inactivity stiffness affecting one or a few joints at any given time.

As for radiological assessment, plain radiographs are suitable for the diagnosis of hand osteoarthritis, namely, posteroanterior radiographs of both hands. Features seen include joint space narrowing, subchondral bone sclerosis and subchondral cysts, as is well known in the art.

Erosive hand osteoarthritis is a subset of hand osteoarthritis characterized by the presence of subchondral bone erosions at the interphalangeal joints in plain radiographs. Typically, erosive hand osteoarthritis has an abrupt onset, a faster progression and more aggressive disease course, with marked pain and inflammation and decreased hand functionality. Synovitis and tenosynovitis are also frequent in erosive hand osteoarthritis.

As disclosed in Examples 4 and 5, surprisingly, montelukast was outstandingly effective for improving the clinical symptoms, for relieving pain, ameliorating hand functionality and for improving radiological features in patients suffering from erosive hand osteoarthritis.

Furthermore, the patients with erosive hand osteoarthritis included in those studies had been previously treated with conventional therapy with analgesics and/or with anti-inflammatory agents and were non-respondent to such therapy.

An embodiment of the present invention relates to the treatment of patients suffering from erosive hand osteoarthritis which are non-respondent to the treatment with analgesics and/or anti-inflammatory agents.

As is well known to the common practitioner, patients who are non-respondent to therapy are those who show no improvement or insufficient improvement in their symptoms with the therapy.

Within the context of the present invention the term "treatment" or "treating" referred to hand osteoarthritis, and in particular to erosive hand osteoarthritis, relates to the elimination, alleviation, improvement or stabilization (i.e. not worsening) of one or more symptoms or manifestations associated to the disease, for example, cartilage degeneration, joint space narrowing, subchondral bone erosions, subchondral sclerosis, osteophyte formation, bony enlargement (for example forming nodes, such as Heberden's nodes, involving the distal interphalangeal joints and/or Bouchard's nodes, involving the proximal interphalangeal joints), synovitis, tenosynovitis, pain, tenderness, stiffness, inflammation, swelling, diminished grip strength and hand functionality.

Some of the symptoms are evaluated by radiographic tests, while others are evaluated by clinical assessment such as moderate-severe pain and hand functionality.

Treatment methods comprise administering to a subject a therapeutically effective amount of montelukast, of a pharmacologically salt thereof.

The duration of the treatment depends on several factors, mainly, on the severity of the condition and its evolution. As it is a degenerative disease, associated with age, chronic administration may be required.

Montelukast

Montelukast is the International Nonproprietary Name (INN) assigned to the compound 2-[1-[[(1R)-1-[3-[(E)-2-(7-chloroquinolin-2-yl)ethenyl]phenyl]-3-[2-(2-hydroxypropan-2-yl)phenyl]propyl]sulfanylmethyl]cyclopropyl]acetic acid (CAS Number: 158966-92-8).

Pharmacologically, montelukast is a selective cysteinyl leukotriene type 1 (Cys-LT$_1$) receptor antagonist which is used in therapy for the treatment of asthma and allergies. It is commercially available as the sodium salt (montelukast sodium) in medicines for the treatment of asthma and seasonal allergies, for example sold under the tradename SINGULAIR®.

The preparation of montelukast is disclosed, for example, in the article Labelle et al., *Discovery of MK-0476, a potent and orally active leukotriene D$_4$ receptor antagonist devoid of peroxisomal enzyme induction*, Bioorg. Med. Chem. Lett, 1995, 5(3), 283-288. Montelukast is also widely available from commercial sources.

Chemically, the montelukast molecule includes a carboxylic acid group. Under the scope of the present invention, montelukast may be used as a free acid or in the form of a pharmaceutically acceptable salt thereof.

"Pharmaceutically acceptable" means that said salt is suitable for preparing a pharmaceutical composition because it is non-toxic and is not biologically undesirable.

Montelukast, as an acidic compound, may form basic addition salts with organic or inorganic bases. Inorganic bases which form suitable salts include, among others, alkali and alkaline earth metal hydroxides, such as lithium, sodium, potassium, calcium or magnesium hydroxide, to form montelukast lithium, montelukast sodium, montelukast potassium, montelukast calcium or montelukast magnesium salts, respectively. Montelukast may also form salts with amines, for example, with ammonia to form montelukast ammonium, or with other organic amines.

Any pharmaceutically acceptable salt of montelukast is encompassed within the scope of the present invention.

In a preferred embodiment montelukast is used as a pharmaceutically acceptable salt.

In one embodiment of the invention the montelukast pharmaceutically acceptable salt is selected from an alkali metal salt or an alkaline earth metal salt, preferably is selected from montelukast lithium, montelukast sodium, montelukast potassium, montelukast calcium or montelukast magnesium, and more preferably is montelukast sodium.

In a preferred embodiment montelukast is used as montelukast sodium.

According to the use of the present invention, montelukast can be administered either orally or topically.

In one embodiment of the invention, montelukast or a pharmaceutically acceptable salt thereof is administered orally.

When the administration is oral, montelukast or a pharmaceutically acceptable salt thereof is administered in a dose generally comprised in the range 1-200 mg/day, expressed as equivalent dose of montelukast.

In the clinical study disclosed in Example 4 oral montelukast in a daily dose of 10 mg was outstandingly effective in patients suffering from erosive hand osteoarthritis, with relief in pain and improvement in clinical and radiological symptoms.

Furthermore, in the study disclosed in Example 5, 9 patients selected from the previous study, who were non respondent to the treatment with 10 mg montelukast daily, were given 20 mg montelukast daily. It was surprisingly found that after only a few days of treatment, the therapy was outstandingly effective, both in terms of pain relief and improvement of hand function.

Montelukast is known to be a safe and well tolerated drug, which does not cause adverse effects even at high doses, for example of 200 mg/daily (Stroms et al., *Clinical safety and tolerability of montelukast, a leukotriene receptor antagonist, in controlled clinical trials in patients aged ≥6 years*, Clin. Exp. Allergy, 2001, 31, 77-87).

Therefore, the treatment according to the present invention allows to adapt the dose of montelukast to be administered and the duration of treatment to the particular condition of each patient and to the severity of the disease.

A preferred oral dose of montelukast is comprised in the range 2-80 mg/day. A more preferred oral dose of montelukast is comprised in the range 5-70 mg/day. A still more preferred oral dose of montelukast is comprised in the range 10-50 mg/day.

In one embodiment, the dose of montelukast is comprised in the range 5-15 mg/day, preferably 7-13 mg/day, more preferably 9-11 mg/day, and still more preferably the dose is about 10 mg/day.

In one embodiment, the dose of montelukast is comprised in the range 7-25 mg/day, preferably 10-20 mg/day, more preferably 14-16 mg/day, and still more preferably the dose is about 15 mg/day.

In one embodiment, the dose of montelukast is comprised in the range 10-30 mg/day, preferably 15-25 mg/day, more preferably 19-21 mg/day, and still more preferably the dose is about 20 mg/day.

In one embodiment, the dose of montelukast is comprised in the range 12-37 mg/day, preferably 20-30 mg/day, more preferably 24-36 mg/day, and still more preferably the dose is about 25 mg/day.

In one embodiment, the dose of montelukast is comprised in the range 15-45 mg/day, preferably 25-35 mg/day, more preferably 29-31 mg/day, and still more preferably the dose is about 30 mg/day.

In one embodiment, the dose of montelukast is comprised in the range 20-60 mg/day, preferably 35-45 mg/day, more preferably 39-41 mg/day, and still more preferably the dose is about 40 mg/day.

In one embodiment, the dose of montelukast is comprised in the range 25-75 mg/day, preferably 45-55 mg/day, more preferably 49-51 mg/day, and still more preferably the dose is about 50 mg/day.

Suitable oral daily doses of montelukast are, for example, about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 or 50 mg. Other higher doses, up to 200 mg/day are also suitable.

According to one aspect of the invention, montelukast-based treatment is considered as a personalized therapy and is prescribed depending on the patient's response to the initial montelukast dose prescribed and according to specialist's criteria.

The above doses are either of montelukast or of a pharmaceutically acceptable salt thereof, but are always expressed as equivalent dose of montelukast.

Thus, along the present description, as well as in the claims, the doses of montelukast are expressed as equivalent doses of montelukast free acid, irrespective of whether it is administered as free acid or as a salt.

When montelukast is administered as a salt, the dose is adjusted to provide the required equivalent dose of montelukast free acid.

Such daily doses may be administered in one single administration, according to a once-daily regimen (q.d.) or may be divided in several administrations during the day, for example, twice-daily (b.i.d.), three times daily (t.i.d) or four times daily (q.i.d.).

When the daily dose of montelukast is administered divided in two or more administrations (i.e., b.i.d., t.i.d., or q.i.d.) preferably, the total daily dose is divided in equal partial doses. For example, a 12 mg daily dose according to a b.i.d. regimen is administered in two equal doses of about 6 mg; or according to a t.i.d. in three equal doses of about 4 mg.

Preferably montelukast is administered according to a once-daily regimen or a twice-daily regimen, and more preferably, montelukast is administered according to a once-daily administration regimen.

In another embodiment of the invention, montelukast or a pharmaceutically acceptable salt thereof is administered topically.

The topical administration involves the application of an effective amount of montelukast, in the form of a suitable topical pharmaceutical formulation, to the skin in the affected parts of the hand, particularly, near the affected joints.

The topical administration, as used herein, is equivalent to "transdermal", "transcutaneous" or "percutaneous" administration, and means the administration through the skin for delivering montelukast to the affected tissues underlying the skin.

The dosage of montelukast when it is topically administered varies depending on the extent and severity of the disease in the affected patient.

The topical administration is even safer in terms of the possible adverse effects derived of the systemic absorption of montelukast. Therefore, the dosage in the case of topical administration may be still less constrained than in the oral administration.

In the topical administration, the dosage may be comprised in the range 1-200 mg daily per affected hand. Preferably, the dosage range is 2-80 mg, more preferably 5-70 mg and still more preferably 10-50 mg daily per affected hand.

These dosages may be administered in one single administration per day or divided in several administrations daily.

The duration of the treatment with montelukast, according to the use of the present invention, may vary from about a one week to years, depending on the evolution of the disease. Montelukast is a safe drug, substantially devoid of adverse effects and, therefore, prolonged treatments are suitable, if needed. The skilled practitioner will have no difficulties in adapting the duration of the therapy in each case, depending on the severity of the disease and on patient's evolution.

Pharmaceutical Compositions

Montelukast or a pharmaceutically acceptable salt thereof according to the use of the present invention is generally administered in the form of a pharmaceutical composition comprising the active ingredient, i.e., montelukast or a pharmaceutically acceptable salt thereof and at least one pharmaceutically acceptable excipient and/or vehicle.

Therefore, another aspect of the present invention relates to a pharmaceutical composition comprising montelukast or a pharmaceutically acceptable salt thereof for use in the treatment of erosive hand osteoarthritis in a human subject.

Another aspect of the invention is a method of treating erosive hand osteoarthritis in a patient comprising the step of administering to a patient in need thereof an effective amount a pharmaceutical composition comprising montelukast or a pharmaceutically acceptable salt thereof and at least one pharmaceutically acceptable excipient and/or vehicle.

Another aspect of the invention is the use of a pharmaceutical composition comprising montelukast or a pharmaceutically acceptable salt thereof and at least one pharmaceutically acceptable excipient and/or vehicle for the preparation of a medicine for the treatment of erosive hand osteoarthritis in a human subject.

The pharmaceutical composition for use in according to the present invention is any conventional formulation which can be prepared using methods that are well known to the person skilled in pharmaceutical formulation, as those disclosed in handbooks of pharmaceutical technology, for example, in the book J. P Remington and A. R. Genaro, *Remington The Science and Practice of Pharmacy*, 20$^{th}$ edition, Lippincott, Williams & Wilkins, Philadelphia, 2000 [ISBN: 0-683-306472] or in the book M. E. Aulton and K. M. G. Taylor, *Aulton's Pharmaceutics, the design and manufacture of medicines*, 4$^{th}$ edition, Churchill Livingstone Elsevier, 2013 [ISBN: 978-0-7020-4290-4], or in the book A. K. Dash, S. Singh and J. Tolman, *Pharmaceutics. Basic principles and application to pharmacy practice*, Academic Press, Elsevier, 2014 [ISBN: 978-0-12-386890-9].

The excipients suitable to be used in the pharmaceutical compositions of the present invention are also well known to those skilled in pharmaceutical technology and are described, for example, in the book R. C. Rowe, P. J. Sheskey and P. J. Weller, *Handbook of Pharmaceutical Excipients*, Sixth Edition, Pharmaceutical Press, 2009.

The pharmaceutical compositions suitable for the use according to the present invention are all those appropriate for being administered either orally or topically.

In one embodiment of the invention, the pharmaceutical composition is a composition suitable for oral administration. Any pharmaceutical form suitable for oral administration is included within the use according to the present invention, preferably solid compositions, or either liquid, in solution, suspension or syrup form, for example.

Solid dosage forms typically include tablets, capsules, granules and powders.

Tablets containing montelukast or a pharmaceutically acceptable salt thereof, for the use according to the present invention, can be formulated using standard techniques well known in the art. Such tablets may be formulated as conventional compressed tablets, buccal tablets, sublingual tablets, chewable tablets, effervescent tablets, enteric-coated tablets, film-coated tablets, sustained-release tablets or orally-disintegrating tablets, by selecting suitable excipients and procedures well known to the skilled in pharmaceutical formulation.

Alternatively, montelukast or a pharmaceutically acceptable salt thereof may be formulated in the form of capsules. In capsules, as is well known in the art, the active ingredient, typically with at least one pharmaceutically acceptable excipient, is enclosed within either a hard or a soft soluble shell. The major component of a capsule shell is gelatin, while other components include water, colorants, plasticizers, such as glycerine or sorbitol, and opacifying agents. Hypromellose can alternatively be used as capsule shell material.

The montelukast formulation according to the present invention may also be in the form of powders or granules for oral administration. They may be directly administered to the oral cavity or either they can be previously dissolved or dispersed in water or in other liquids before being ingested. They may also be effervescent powders or granules.

Powders are intimate mixtures of dry, finely divided drugs with one or more excipients. Typically, the powders are subjected to mixing process to obtain an homogeneous mixture, for example through trituration, spatulation, sifting or tumbling procedures, which are well-known in the art.

Granules consist of powder particles that have been aggregated to form larger particles, and they are typically prepared by dry granulation or wet granulation procedures, which are also well known in the art.

Furthermore, granules may be coated granules, gastro-resistant granules or modified-release granules The pharmaceutically acceptable excipients that can be used for preparing oral pharmaceutical compositions in solid form, such as tablets, capsules, granules or powders, are well known to those skilled in the art and include, for example, diluents such as calcium carbonate, calcium phosphate, calcium sulfate, cellulose acetate, dextrates, dextrins, dextrose, ethyl cellulose, fructose, gelatin, glyceryl palmitostearate, isomalt, kaolin, lactitol, lactose, magnesium carbonate, magnesium oxide, maltodextrins, maltose, microcrystalline or powdered cellulose, polymethacrylates, pregelatinized starch, starch, sodium carbonate, sodium chloride, sorbitol or sucrose, among others, and mixtures thereof; lubricants, such as calcium stearate, glyceryl behenate, glyceryl palmitostearate, hydrogenated castor oil, magnesium stearate, polyethylene glycol, sodium benzoate, sodium lauryl sulfate, sodium stearyl fumarate, stearic acid, or talc, among others, and mixtures thereof; disintegrants such as alginic acid, crospovidone, sodium croscarmellose, sodium starch glycolate, starch, low-substituted hydroxypropyl cellulose, among others, and mixtures thereof; binding agents such as acacia, cellulose acetate phthalate, dextrates, dextrin, ethylcellulose, guar gum, hydroxyethyl cellulose, hydroxyethylmethyl cellulose, hydroxypropyl cellulose, hydroxypropylmethyl cellulose methylcellulose, maltodextrin, microcrystalline cellulose, sucrose, povidone, pregelatinized starch, sodium carboxymethylcellulose, starch or stearic acid, among others, and mixtures thereof; glidants such as tribasic calcium phosphate, powdered cellulose, colloidal silicon dioxide, magnesium oxide, magnesium silicate, magnesium trisilicate, silicon dioxide, or talc, among others, and mixtures thereof; sweetening agents such as sorbitol, maltitol, mannitol, dextrose, isomalt, maltose, xylitol, saccharin, sucrose, sucralose, aspartame, acesulfame potassium, or trehalose, among others, and mixtures thereof; flavouring agents such as maltol, vanillin, ethyl vanillin, menthol, citric acid, fumaric acid, ethyl maltol, tartaric acid, peppermint, artificial or natural fruit aromas, among others, and mixtures thereof; colouring agents such as curcumin, lactoflavin, iron oxides (red, yellow or black), caramel, lactoflavin phosphate, cochineal red, titanium dioxide, or carotenes, among others, and mixtures thereof; or mixtures thereof.

In one embodiment, montelukast or a pharmaceutically acceptable salt thereof for use according to the present invention, is in the form of a pharmaceutical composition for oral administration selected from the group consisting of tablets, capsules, powders or granules. In one preferred embodiment is in the form of tablets. In another preferred embodiment, is in the form of capsules, preferably in the form of hard capsules. In another preferred embodiment is in the form of granules. In another preferred embodiment, is in the form of powder.

In one embodiment of the invention, montelukast or a pharmaceutically acceptable salt thereof, is used as a powder or granulate composition and is presented in the form of monodose sachets, containing the unit dose of the active ingredient. Those sachets can be made of paper or either of aluminium or plastic laminates.

The unit dose of montelukast or a pharmaceutically acceptable salt thereof contained in either a tablet, or a capsule or a monodose sachet of the composition in form of powder or granulate may be the suitable daily dosage, when it is intended for a once-daily dosage regimen, or may be half of the daily dosage, when it is intended for a twice-daily dosage regimen, or may be a third of the daily dosage, when it is intended for a three-times daily dosage regimen, or may be a fourth of the daily dosage, when it is intended for a four-times daily regimen.

In one embodiment, each tablet, capsule or powder or granulate monodose sachet comprises a dose of montelukast or a pharmaceutically acceptable salt thereof comprised in the range 1-200 mg, preferably comprised in the range 2-80 mg, more preferably comprised in the range 5-70 mg, and more preferably comprised in the range 10-50 mg, expressed as equivalent dose of montelukast. Preferred unit doses may be selected, for example from about 5, 6, 7, 8, 9, 10, 11, 12, 13, 14, 15, 16, 17, 18, 19, 20, 21, 22, 23, 24, 25, 26, 27, 28, 29 and 30 mg, expressed as the equivalent dose of montelukast when montelukast is used as a salt. Preferred doses are about 5, about 10, about 15, about 20 mg and about 30 mg of montelukast or an acceptable salt thereof in each tablet, capsule or monodose sachet, expressed as equivalent dose of montelukast. The doses are expressed as the equivalent dose of montelukast when montelukast is used as a salt.

Liquid oral dosage forms of montelukast or a pharmaceutical salt thereof which are suitable for the use according to the present invention include solutions, suspensions or syrups, for example.

Oral solutions contain the active substance dissolved in a vehicle, which is typically water optionally with additional co-cosolvents. Syrups are oral aqueous solutions containing high concentrations of sucrose or other sugars. Sugar-free syrups are obtained by replacing sucrose with hydrogenated glucose, mannitol, sorbitol or xylitol, for example. In oral suspensions the active substance is dispersed in a liquid medium. The formulation of oral solutions and/or suspension includes one or more additional excipients, such as solubilizers, stabilizers, buffers, antioxidants, preservatives, flavouring agents, colouring agents, and sweetening agents, among others.

The more common vehicle in oral solutions and suspensions is water; other suitable co-solvents include ethanol, propylene glycol, polyethylene glycol 300 or 400 and glycerine, among others, and mixtures thereof. As is well known in the art, other suitable excipients for use in oral solutions and/or suspensions include buffering agents such as diethanolamine, dibasic sodium phosphate, monobasic sodium phosphate, potassium citrate, sodium bicarbonate, sodium citrate dihydrate, among others, and mixtures thereof; surfactants such as polyoxyethylene castor oil derivatives and sorbitan esters; preservatives such as benzalkonium chloride, benzyl alcohol, bronopol, parabens, sodium benzoate, sodium propionate, sorbic acid, domifen bromide or thimerosal, among others, and mixtures thereof; antioxidants such as sodium sulphite, sodium bisulphite, sodium metabisulfite, butylated hydroxytoluene (BHT), butylated hydroxyanisole (BHA), propyl gallate, and mixtures thereof; viscosity modifiers such as acacia, alginic acid, bentonite, carbomers, carrageenan, gelatin, glycerin, hydroxyethyl cellulose, hydroxyethylmethyl cellulose, hydroxypropyl cellulose, maltodextrin, polyvinyl alcohol, sodium alginate, tragacanth, or xanthan gum, among others and mixtures thereof; suspending agents such as xanthan gum, guar gum, alginic acid, bentonite, carbomers, sodium or calcium carboxymethylcellulose, hydroxyethyl cellulose, hydroxypropyl cellulose, hydroxypropylmethyl cellulose, hydroxypropyl alginate, microcrystalline or powdered cellulose, anhydrous colloidal silica, dextrins, gelatins, kaolin, magnesium aluminium silicate, maltitol, povidone, sorbitan esters, or tragacanth, among others, and mixtures thereof; flavouring agents as maltol, vanillin, ethyl vanillin, menthol, citric acid, fumaric acid, ethyl maltol, tartaric acid, peppermint, artificial or natural fruit aromas, among others, and mixtures thereof; sweetening agents such as sorbitol, maltitol, mannitol, dextrose, isomalt, maltose, xylitol, saccharin, sucrose, sucralose, aspartame, acesulfame potassium or trehalose, among others, and mixtures thereof; colouring agents such as curcumin, lactoflavin, caramel, lactoflavin phosphate, cochineal red, or carotenes, among others, and mixtures thereof.

In one embodiment, montelukast or a pharmaceutically acceptable salt thereof for use according to the present invention, is in the form of a liquid pharmaceutical composition for oral administration selected from a solution and a suspension.

Typically, such liquid dosage forms for oral use may be supplied as multi-dose or as single-dose preparations. Each dose from a multi-dose container is administered by means of a device, suitable for measuring the prescribed volume. The measuring device may be, for example, such as a spoon, a cup, an oral syringe, or a dropper.

Each measured dose typically comprises an amount of montelukast or a pharmaceutically acceptable salt thereof comprised in the range 1-200 mg, preferably comprised in the range 2-80 mg, more preferably comprised in the range 5-70 mg, and still more preferably comprised in the range 10-50 mg, expressed as equivalent dose of montelukast. Preferred unit doses may be selected, for example, from about 5, 6, 7, 8, 9, 10, 11, 12, 13, 14, 15, 16, 17, 18, 19, 20, 21, 22, 23, 24, 25, 26, 27, 28, 29 and 30 mg, expressed as the equivalent dose of montelukast when montelukast is used as a salt. Preferred doses are about 5, about 10, about 15, about 20 mg and about 30 mg of montelukast or an acceptable salt thereof in each measured dose of the liquid composition, expressed as equivalent dose of montelukast.

In another embodiment of the invention, the pharmaceutical composition is appropriate for topical administration. Any pharmaceutical form suitable for topical administration is included within the use of the present invention, typically in liquid or semisolid form. The liquid compositions suitable for topical administration can be prepared by dissolving or dispersing montelukast or a pharmaceutically acceptable salt thereof in a suitable carrier such as, for example, water, alcohols, glycols, or mixtures thereof, and are, for example, lotions, liniments, or tinctures; or else this liquid composition can be used to impregnate a support in the form of dressing or bandage that is applied to the affected area; or alternatively the liquid composition can be sprayed onto the affected area using pump sprayers or aerosols.

Other forms of topical administration are semisolid compositions such as creams, gels, ointments or pastes, comprising a pharmaceutically acceptable carrier or vehicle in which montelukast or a pharmaceutically acceptable salt thereof is dissolved, emulsified, dispersed or suspended.

Creams, as it is well known to those skilled in pharmaceutical technology are semisolid emulsions, which can be of the oil-in-water (o/w) type or water-in-oil (w/o) type, formulated from an oil phase, an aqueous phase and an emulsifying agent. Gels are obtained from a liquid that is gelled by adding a rheological agent or a gelling agent. Ointments are semisolid fat preparations, which contain the active ingredient dissolved or in dispersed form. Ointments can be formulated with various vehicles such as paraffin, plastibases (a mixture of polyethylene with a series of hydrocarbons) or vegetable oils. Pastes are prepared analogously to the ointments, and they show a more solid consistency since they contain greater amounts of insoluble solids.

The vehicle in topical compositions may be water or other water-soluble or water-miscible vehicles, such as lower alcohols (e.g. ethanol or isopropanol) glycols (e.g. ethylene glycol, propylene glycol or polyethylene glycol 300), or glycerol, among others, or mixtures thereof. Suitable oily vehicles include almond oil, corn oil, sesame oil, castor oil, soya oil, paraffin oil, peanut oil, olive oil, cottonseed oil, lanolin, glyceryl monostearate, or linseed oil, among others, or mixtures thereof. Additional excipients include emulsifying agents such as calcium stearate, stearic acid, cetyl alcohol, ethylene glycol palmitostearate, glyceryl monostearate, lecithin, phospholipids, oleic acid, poloxamers, sodium lauryl sulfate, sorbitan esters, polyoxyethylene castor oil derivatives, or emulsifying wax, among others, and mixtures thereof; gelling agents such as carrageenan, guar gum, tragacanth gum, locust bean gum, xanthan gum, pectin, agar, alginic acid, carbomers, carboxymethylcellulose, methylcellulose, hydroxyethyl cellulose, hydroxypropylmethyl cellulose, and polyethylene glycol, among others, and mixtures thereof; emollients such as petrolatum, mineral oil, myristyl, cetyl alcohol, stearyl alcohol, cetostearyl alcohol, glyceryl monostearate, glyceryl monooleate, isopropyl myristate, isopropyl palmitate, cholesterol, lanolin alcohols, and glycerine, among others, and mixtures thereof; thickening agents or viscosity-increasing agents such as carbomers, carboxymethylcellulose sodium, carboxymethylcellulose calcium, hyaluronic acid, hydroxyethyl cellulose, hydroxyethylmethyl cellulose, hydroxypropylmethyl cellulose, acacia, guar gum, xanthan gum, alginic acid, bentonite, carrageenan, clay, gelatin, sodium alginate, tragacanth, among others and mixtures thereof; antioxidants such as ascorbic acid, ascorbyl palmitate, butylated hydroxyanisole, butylated hydroxytoluene, chelating agents, citric acid monohydrate, fumaric acid, malic acid, potassium metabisulfite, propyl gallate, sodium ascorbate, sodium bisulfite, sodium metabisulfite, sodium sulfite, sodium thiosulfate, among others, and combinations thereof; preservatives such as benzalkonium chloride, benzyl alcohol, bronopol, chlorhexidine, imidurea, parabens, phenoxyethanol, sodium benzoate, sodium propionate, sorbic acid or thimerosal, among others, and mixtures thereof; buffering agents and pH adjusting agents, such as boric acid, citric acid monohydrate, diethanolamine, dibasic sodium phosphate, malic acid, maleic acid, monobasic sodium phosphate, potassium citrate, sodium acetate, sodium carbonate, sodium bicarbonate, sodium citrate dihydrate, sodium borate, sodium hydroxide, sodium lactate, triethanolamine, among others, and mixtures thereof; perfume agents such as mint, herbal, cocoa butter and floral oil fragrances, among others; and colouring agents suitable for pharmaceutical use; among others, and mixtures thereof.

In one embodiment, montelukast or a pharmaceutically acceptable salt thereof for use according to the present invention, is in the form of a pharmaceutical composition for a composition for topical administration selected from the group consisting of cream, gel, ointment and paste.

The percentage of montelukast or a pharmaceutically acceptable salt thereof in the pharmaceutical composition may vary according to the specific pharmaceutical dosage form and the particular dose intended. Typically, the percentage of the active ingredient in an oral solid pharmaceutical composition is comprised between 0.1 and 50% w/w, expressed as the equivalent amount of montelukast relative to the total weight of the composition.

In oral liquid pharmaceutical compositions, the concentration of montelukast or a pharmaceutically acceptable salt thereof may also widely vary depending on the specific formulation and the desired concentration, for example, from 0.1 to 20% w/v, expressed as equivalent grams of montelukast in 100 ml of the composition.

In topical compositions, the amount of montelukast or a pharmaceutical salt thereof may be in the range 0.5-50 w/w %, for example, expressed as equivalent amount of montelukast relative to the total weight of the composition.

The present invention involves the following embodiments:

1.—Montelukast or a pharmaceutically acceptable salt thereof for use in the treatment of erosive hand osteoarthritis in a human subject.

2.—A pharmaceutically acceptable salt of montelukast for use according to embodiment 1.

3.—The pharmaceutically acceptable salt of montelukast for use according to embodiment 2, characterized in that the montelukast pharmaceutically acceptable salt is selected from an alkali metal salt or an alkaline earth metal salt.

4.—The pharmaceutically acceptable salt of montelukast for use according to embodiment 3, characterized in that the montelukast pharmaceutically acceptable salt is selected from the group consisting of montelukast lithium, montelukast sodium, montelukast potassium, montelukast calcium and montelukast magnesium.

5.—The pharmaceutically acceptable salt of montelukast for use according to embodiment 4, characterized in that the montelukast pharmaceutically acceptable salt is montelukast sodium.

6.—Montelukast or a pharmaceutically acceptable salt thereof for use according to any of embodiments 1 to 5, characterized in that montelukast or a pharmaceutically acceptable salt thereof is for oral administration.

7.—Montelukast or a pharmaceutically acceptable salt thereof for use according to embodiment 6, characterized in that the dose of montelukast or a pharmaceutically acceptable salt thereof is comprised between 1 and 200 mg/day, preferably comprised between 2 and 80 mg/day, more preferably comprised between 5 and 70 mg/day, and still more preferably comprised between 10 and 50 mg/day, expressed as equivalent dose of montelukast.

8. Montelukast or a pharmaceutically acceptable salt thereof for use according to embodiment 6, characterized in that the dose of montelukast or a pharmaceutically acceptable salt thereof is comprised between 5 and 15 mg/day, preferably comprised between 7 and 13 mg/day, more preferably comprised between 9 and 11 mg/day, and still more preferably the dose is about 10 mg/day, expressed as equivalent dose of montelukast.

9. Montelukast or a pharmaceutically acceptable salt thereof for use according to embodiment 6, characterized in that the dose of montelukast or a pharmaceutically acceptable salt thereof is comprised between 7 and 25 mg/day, preferably comprised between 10 and 20 mg/day, more preferably comprised between 14 and 16 mg/day, and still more preferably the dose is about 15 mg/day, expressed as equivalent dose of montelukast.

10. Montelukast or a pharmaceutically acceptable salt thereof for use according to embodiment 6, characterized in that the dose of montelukast or a pharmaceutically acceptable salt thereof is comprised between 10 and 30 mg/day, preferably comprised between 15 and 25 mg/day, more preferably 19-21 mg/day, and still more preferably the dose is about 20 mg/day, expressed as equivalent dose of montelukast.

11. Montelukast or a pharmaceutically acceptable salt thereof for use according to embodiment 6, characterized in that the dose of montelukast or a pharmaceutically acceptable salt thereof is comprised between 12 and 37 mg/day, preferably comprised between 20 and 30 mg/day, more preferably comprised between 24 and 36 mg/day, and still more preferably the dose is about 25 mg/day, expressed as equivalent dose of montelukast.

12. Montelukast or a pharmaceutically acceptable salt thereof for use according to embodiment 6, characterized in that the dose of montelukast or a pharmaceutically acceptable salt thereof is comprised between 15 and 45 mg/day, preferably comprised between 25 and 35 mg/day, more preferably comprised between 29 and 31 mg/day, and still more preferably the dose is about 30 mg/day, expressed as equivalent dose of montelukast.

13. Montelukast or a pharmaceutically acceptable salt thereof for use according to embodiment 6, characterized in that the dose of montelukast or a pharmaceutically acceptable salt thereof is comprised between 20 and 60 mg/day, preferably comprised between 35 and 45 mg/day, more preferably comprised between 39 and 41 mg/day, and still more preferably the dose is about 40 mg/day, expressed as equivalent dose of montelukast.

14. Montelukast or a pharmaceutically acceptable salt thereof for use according to embodiment 6, characterized in that the dose of montelukast or a pharmaceutically acceptable salt thereof is comprised between 25 and 75 mg/day, preferably comprised between 45 and 55 mg/day, more preferably comprised between 49 and 51 mg/day, and still more preferably the dose is about 50 mg/day, expressed as equivalent dose of montelukast.

15.—Montelukast or a pharmaceutically acceptable salt thereof for use according to any of embodiments 7 to 14, characterized in that the daily dose is for administration according to a dosage regimen selected from: once-daily (q.d), twice-daily (b.i.d.), three times daily (t.i.d) and four times daily (q.i.d.), preferably the dosage regimen is selected from once-daily and twice-daily, and more preferably the dosage regimen is once-daily.

16.—Montelukast or a pharmaceutically acceptable salt thereof for use according to any of embodiments 7 to 15, characterized in that the posology is adapted according to patient's response to the treatment.

17.—Montelukast or a pharmaceutically acceptable salt thereof for use according to any of embodiments 1 to 5, characterized in that montelukast or a pharmaceutically acceptable salt thereof is for topical administration.

18.—Montelukast or a pharmaceutically acceptable salt thereof according to any of embodiments 1 to 5, characterized in that montelukast or a pharmaceutically acceptable salt thereof is in the form of a pharmaceutical composition comprising montelukast or a pharmaceutically acceptable salt thereof and at least one pharmaceutically acceptable excipient and/or vehicle.

19.—Montelukast or a pharmaceutically acceptable salt thereof for use according to embodiment 18, characterized in that montelukast or a pharmaceutically acceptable salt thereof is in the form of a solid pharmaceutical composition for oral administration, preferably selected from the group consisting of tablets, capsules, powders and granules.

20.—Montelukast or a pharmaceutically acceptable salt thereof for use according to embodiment 18, characterized in that montelukast or a pharmaceutically acceptable salt thereof is in the form of a liquid pharmaceutically composition for oral administration, preferably selected from a solution and a suspension.

21.—Montelukast or a pharmaceutically acceptable salt thereof for use according to embodiment 19 or 20, characterized in that each monodose, preferably, each tablet, capsule, powder or granule monodose sachet or liquid measured monodose comprises a dose of montelukast or a pharmaceutically acceptable salt thereof comprised in the range 1-200 mg, preferably comprised in the range 2-80 mg, more preferably comprised in the range 5-70 mg, and still more preferably comprised in the range 10-50 mg, expressed as equivalent dose of montelukast.

22.—Montelukast or a pharmaceutically acceptable salt thereof for use according to embodiment 18, characterized in that montelukast or a pharmaceutically acceptable salt thereof is in the form of a pharmaceutical composition for topical administration, preferably selected from the group consisting of cream, gel, ointment and paste.

23.—Montelukast or a pharmaceutically acceptable salt thereof for use according to embodiment 22, characterized in that the amount of montelukast or a pharmaceutically acceptable salt thereof in the composition is in the range 0.5-50 w/w %, expressed as equivalent amount of montelukast relative to the total weight of the composition Next, some examples are provided with the purpose of illustrating the invention, but not limiting it.

EXAMPLES

Example 1.—Preparation of Montelukast Orodispersible Powder

A composition in powder form was prepared using the following components in the range of weight concentrations included in the table below:

| Ingredient | % (weight) |
|---|---|
| Montelukast sodium (as equivalent montelukast) | 2.00-10.00 |
| Sucrose | 40.00-70.00 |
| Polyol-based sweetener | 10.00-50.00 |
| Powder cellulose | 5.00-20.00 |
| Sucralose | 0.30-1.50 |
| Hypromellose | 0.50-2.00 |
| Magnesium stearate | 0.20-2.00 |
| Cream flavour | 0.10-1.50 |
| Total | 100.00 |

All the ingredients were placed in an appropriate container and were mixed in a rotating drum for 10 to 30 minutes. The obtained mixture was introduced into monodose sachets. Each monodose sachet contained from 200 mg to 500 mg of the composition.

Example 2.—Preparation of Montelukast Tablet

A composition in form of tablet was prepared using the following components:

| Ingredient | % (weight) |
|---|---|
| Nucleus | |
| Montelukast sodium (as equivalent montelukast) | 2.00-15.00 |
| Lactose monohydrate | 35.00-75.00 |
| Powder cellulose | 10.00-40.00 |
| Sodium croscarmellose | 1.50-5.00 |
| Magnesium stearate | 0.20-1.80 |
| Hydroxypropylmethyl cellulose | 0.50-2.50 |
| Coating | |
| Hydroxypropylmethyl cellulose | 0.50-2.50 |
| Titanium dioxide | 0.01-1.20 |
| Macrogol 4000 | 0.1-0.8 |
| Total tablet | 100.00 |

The composition was prepared according to the following procedure: first, all the ingredients forming the nucleus of the tablet were sieved. Then, the active ingredient was mixed with the rest of the components of the nucleus for 30 minutes to achieve homogeneity. Next, magnesium stearate was added, and the mixture continued for 5 to 10 minutes. Tablets obtained after compression process were coated with the coating components the required time to achieve an appropriate covering. Each tablet contained from 200 mg to 500 mg of the composition.

Example 3.—Preparation of an Aqueous Gel Consistency Formulation for Topical Administration A composition in form of gel was prepared using the following components:

| Ingredient | % (weight) |
| --- | --- |
| Montelukast sodium (as equivalent montelukast) | 0.5-50.0 |
| Isopropyl alcohol | 15.0-30.0 |
| Hydroxyethyl cellulose | 0.1-1.0 |
| Ethanol | 0-15.0 |
| Isopropyl myristate | 5.0-10.0 |
| Butyl hydroxytoluene | 0.001-0.1 |
| Sodium hydroxide | 0-0.2 |
| Hydrochloric acid | 0-0.2 |
| Parfum | 0-0.2 |
| Purified water | q.s. 100 |

The composition was prepared according to the following procedure: montelukast sodium was dissolved in a mixture composed of purified water, isopropyl alcohol, ethanol, isopropyl myristate and butyl hydroxytoluene. The mixture was subjected to continuous stirring to obtain homogeneity. When the mixture was homogeneous, hydroxyethyl cellulose was added, and the mixture was stirred until swelling of the polymer and getting a homogeneous mixture with an aqueous-gel consistency. Then, the parfum was added and the pH was adjusted to an appropriate value for topical administration (in the range 5.5-8.0) by using hydrochloric acid and sodium hydroxide. Finally, the mixture was agitated to homogeneity.

Example 4.—Clinical Study of Oral 10 mg Montelukast Daily in Patients with Erosive Hand Osteoarthritis A preliminary clinical observational study was performed in patients suffering from erosive hand osteoarthritis.

50 patients with erosive hand osteoarthritis which were non-respondent or with limited response after treatment with analgesics and/or anti-inflammatories were selected for the study. The patients were administered 10 mg of montelukast daily by the oral route, using an orally dispersible composition prepared as disclosed in Example 1, according to a once-daily dosage regimen.

The duration of the treatment ranged from 3 to 16 months.

The following parameters were used to evaluate the efficacy of the treatment: (i) improvement in clinical symptoms; (ii) efficacy in pain relief; and (iii) improvement in radiological evaluation. All assessments were focused on one of the hands of the patients.

The improvement in clinical symptoms was assessed by evaluating the improvement in symptoms such as functionality, stiffness and deformity of the affected hand that entail an improvement in the quality of life of the patients.

For assessing the efficacy in pain relief, the patients were asked to evaluate the pain they felt using the visual analogue scale (VAS) methodology, both before the treatment and at the end of the treatment period. The treatment was considered to be effective for pain relief when, on a scale of 0 to 10, a reduction of at least 2 units was observed after the treatment.

For assessing the efficacy of the treatment in the radiological parameters of the hand, the following features in the affected joints were evaluated: a) edema, b) subchondral erosions, c) synovitis and d) tenosynovitis. These features were radiologically assessed by means of posteroanterior radiographs of the hand, performed before and after the treatment period. The treatment was considered to provide radiological improvement if there was observable improvement in at least two of the assessed features and no worsening in the remaining features.

After the treatment period, 32 patients made evident an improvement in clinical symptoms.

45 of the 50 patients had reported pain before starting the treatment. After the treatment period, 28 out of those 45 patients suffering from pain reported effective pain relief.

28 patients showed improvement after radiological evaluation: 28 showed improvement in synovitis, 18 showed improvement in tenosynovitis 19 showed improvement in edema, and 14 showed improvement in erosions. The improvement in the assessed radiological features was outstanding in most of those patients. Furthermore, 10 additional patients showed no worsening of the assessed radiological parameters.

Example 5.—Clinical Study of Oral 20 mg Montelukast Daily in Patients with Erosive Hand Osteoarthritis For this study, 9 patients were selected from the previous study (Example 4) among those who were non-respondents to the treatment (10 mg montelukast daily).

In the present study, the patients were administered a daily dose of montelukast of 20 mg by the oral route, also using an orally dispersible composition prepared as disclosed in Example 1, according to a once-daily dosage regimen. The age of the patients ranged from 52 to 78 years.

As in the previous study, for assessing the efficacy in pain relief, the visual analogue scale (VAS) methodology was used, where the pain was assessed on a scale of 0 to 10.

For assessing the efficacy in hand functionality improvement, also a visual analogue scale (VAS) of 0 to 10 was also used, wherein 0 meant full functionality, i.e., full ability to hold objects, and 10 meant absence of functionality, i.e., inability to hold any object The following table summarizes the results of the study:

| Variable | Mean (SRD) | Min - Max | p-value |
| --- | --- | --- | --- |
| VAS pain initial | 7.00 (0.41) | 5-9 | <0.0005 |
| VAS pain final | 3.89 (0.54) | 1-6 | |
| VAS hand functionality initial | 7.00 (0.29) | 5-8 | <0.0005 |
| VAS hand functionality final | 4.56 (0.39) | 3-6 | |

No adverse effects were reported by any treated patient.

The "initial" values mean the values before starting the treatment, and the "final" values mean the values after completing the treatment.

The range Min-Max shows the individual minimum and maximum values found for each assessed parameter within the patient's population.

In terms of pain, all the selected patients suffered from moderate to severe pain before the treatment, as it is generally considered that a VAS value higher than 4 means significant pain.

It was found that the response to montelukast 20 mg daily was highly significant, both in terms of pain relief and improvement of hand functionality, as shown in the previous table.

There was found to be significant differences in both variables at the beginning and at the end of the treatment (p<<0.0005 in both cases), with mean decrease in pain of 3.89±0.54 and a mean improvement in hand functionality of 4.56±0.39. Almost 70% of the patients not responding to treatment with 10 mg of montelukast daily showed a pain relief of 55% when received montelukast 20 mg daily. All patients showed a significant improvement in hand functionality (35% improvement) when received montelukast 20 mg daily.

Example 6.—Efficacy of Topical Montelukast in Patients with Erosive Hand Osteoarthritis One patient diagnosed as suffering from erosive hand osteoarthritis who had been treated with topical corticoid, methylprednisolone aceponate, for 12 weeks, once daily, without any improvement neither in pain relief (remained with score higher than 5 in a 0-10 scale using VAS methodology) nor in the radiological assessment (showed progression of the disease during the treatment) was recruited for the study.

After a wash-up period of several weeks, the patient started treatment with a topical formulation prepared as disclosed in example 3, with a dosage of about 10 mg daily per hand, spread on the affected zone for a period of 12 weeks. After the treatment, the patient showed significant pain relief and improvement in the clinical symptoms of osteoarthritis.

The invention claimed is:

1. A method of treating erosive hand osteoarthritis, comprising the step of administering to a patient in need thereof an effective amount of montelukast or of a pharmaceutically acceptable salt thereof wherein the effective amount is between 7 and 25 mg, and, wherein the treatment with montelukast or with a pharmaceutically acceptable salt thereof comprises a reduction of synovitis along with a reduction of at least one of edema, subchondral erosions and tenosynovitis.

2. The method of claim 1, comprising the step of administering to the patient an effective amount of a pharmaceutically acceptable salt of montelukast.

3. The method according to claim 2, wherein the montelukast pharmaceutically acceptable salt is selected from an alkali metal salt or an alkaline earth metal salt.

4. The method of claim 3, wherein the montelukast pharmaceutically acceptable salt is montelukast sodium.

5. The method of claim 1, wherein montelukast or the pharmaceutically acceptable salt thereof is orally administered.

6. The method of claim 1, wherein montelukast or the pharmaceutically acceptable salt thereof is administered in a dose of montelukast between 10 and 20 mg/day.

7. The method of claim 1, wherein montelukast or the pharmaceutically acceptable salt thereof is administered in a dose of montelukast of 15 mg/day.

8. The method of claim 1, wherein montelukast or the pharmaceutically acceptable salt thereof is topically administered.

9. The method of claim 8, wherein montelukast or the pharmaceutically acceptable salt thereof is administered in a dose of between 7 and 25 mg/day per affected hand.

10. The method of claim 1, wherein montelukast or the pharmaceutically acceptable salt thereof is in the form of a pharmaceutical composition comprising montelukast or the pharmaceutically acceptable salt thereof and at least one pharmaceutically acceptable excipient or vehicle.

11. The method of claim 10, wherein montelukast or the pharmaceutically acceptable salt thereof is in the form of a solid pharmaceutical composition for oral administration selected from the group consisting of tablets, capsules, powders and granules.

12. The method of claim 10, wherein montelukast or the pharmaceutically acceptable salt thereof is in the form of a solid pharmaceutical composition for oral administration selected from the group consisting of tablets, capsules, and monodose sachets containing powders or granules, and wherein each tablet, capsule or, monodose sachet comprises a dose of montelukast in a range of 7-25 mg.

13. The method of claim 10, wherein montelukast or the pharmaceutically acceptable salt thereof is in the form of a pharmaceutical composition for topical administration.

14. The method of claim 13, wherein the amount of montelukast in the composition is in a range of 0.5-50% w/w relative to the total weight of the composition.

15. The method of claim 13, wherein montelukast or the pharmaceutically acceptable salt thereof is in the form of a cream, gel, ointment or paste.

16. The method of claim 1, wherein montelukast or a pharmaceutically acceptable salt thereof is the sole active ingredient administered to a patient in need thereof.

* * * * *